United States Patent [19]

Hayes

[11] 4,149,515

[45] Apr. 17, 1979

[54] BROILING DEVICE FOR STOVE

[76] Inventor: Robert W. Hayes, 20 Orchard St., Avon, Conn. 06001

[21] Appl. No.: 832,352

[22] Filed: Sep. 12, 1977

[51] Int. Cl.² .............................................. F24C 15/00
[52] U.S. Cl. ....................................... 126/14; 99/391; 126/137; 126/336
[58] Field of Search ............... 126/14, 137, 336, 25 A, 126/41 E, 337 A; 99/390, 391

[56] References Cited

U.S. PATENT DOCUMENTS

| 2,624,331 | 1/1953 | Kennedy | 126/14 X |
| 3,391,685 | 7/1968 | Lemmons et al. | 126/25 A X |
| 3,981,292 | 9/1976 | Lilly et al. | 126/137 |
| 4,046,132 | 9/1977 | White | 126/25 A |

FOREIGN PATENT DOCUMENTS 567564  2/1945  United Kingdom ..................... 126/336

Primary Examiner—Edward G. Favors
Attorney, Agent, or Firm—McCormick, Paulding & Huber

[57] ABSTRACT

A broiler device for a space heating stove having an access opening in one of its generally vertical side walls to receive wood, charcoal or other suitable fuel for heating. The broiler device includes a frame detachably secured to the said generally vertical side wall, and a broiler tray adapted for vertically adjustable connection to the frame so that an open panel of the tray can be supported inside the stove in a generally horizontal position. The open tray supports a grille for holding food to be broiled at the vertically selected height above the fuel in the stove.

6 Claims, 3 Drawing Figures

U.S. Patent  Apr. 17, 1979  4,149,515
FIG. 1
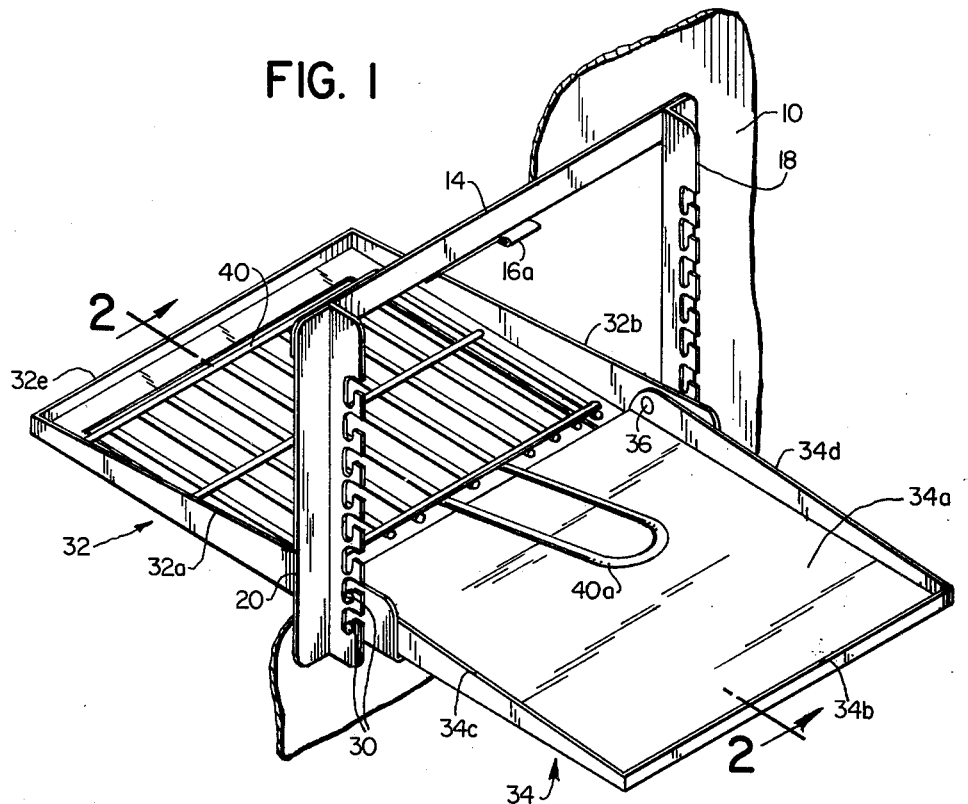
FIG. 3
FIG. 2
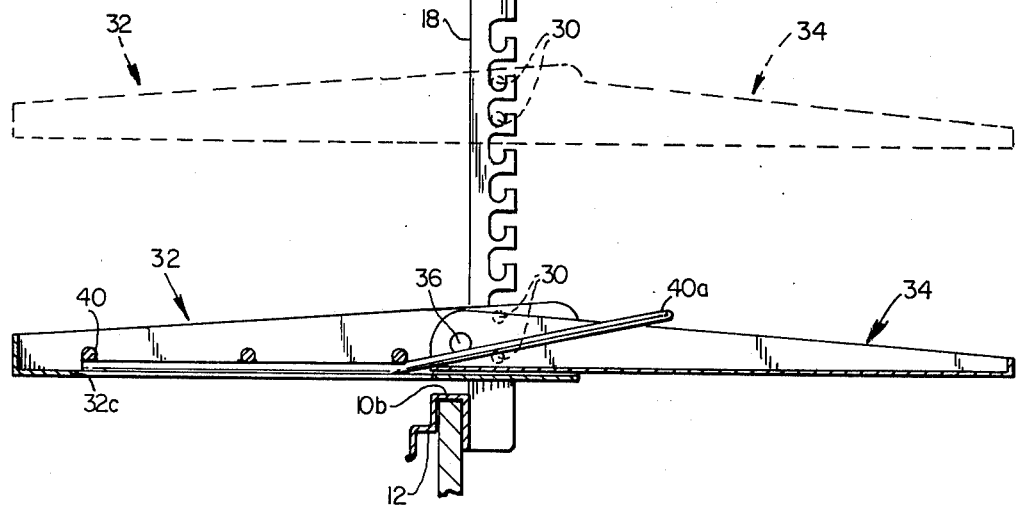

BROILING DEVICE FOR STOVE

BACKGROUND OF THE INVENTION

In the interest of saving modern fuel costs, space heating stoves adapted to burn wood or similarly safe materials have been introduced into modern homes. As an example of such, U.S. Pat. No. 4,036,205 shows a stove adapted for connection to and use in a fireplace.

Most such stoves have a door-closed access opening for introducing wood or other fuel through a generally vertical side wall. The broiler device of the present invention is adapted for detachable connection with such stove when the access door is open and thereby to provide the means for cooking food, and thus further reducing fuel costs while the space heating stove is in operation.

SUMMARY OF THE INVENTION

This invention relates generally to devices for use with wood stoves, and deals more particularly with a broiling device which can be easily fitted in the door opening of such a stove.

The primary aim of the present invention is to provide a device for broiling food inside a wood burning stove, which may have been designed primarily for space heating. Such a stove generally has a front access opening of rectangular shape, and it is a feature of the present invention that this opening can be fitted with a readily removable mounting frame which includes a shelf construction adapted to be adjustably positioned vertically in this mounting frame at any desired height above the coals inside the stove.

In accordance with the presently preferred embodiment of this invention the broiling device includes a generally vertical frame with a channel shaped lower rail adapted to fit on the lower edge of the door opening. An upper rail of this frame includes a latch, or catch, to retain the frame in the door opening, and side frame members define vertically spaced slots for adjustably receiving a broiler tray therebetween. The tray structure has inner and outer panels pivotally connected to one another, and laterally projecting pins, adjacent the pivot axis, fit in the slots of the frame side members. A grille is slidably received on the tray structure for use on the inner panel for broiling, and on the outer panel or shelf for convenience in preparing the food to be broiled.

BRIEF DESCRIPTION OF THE DRAWINGS

FIG. 1 is a perspective view of a device constructed in accordance with the present invention assembled in the access door opening of a conventional wood stove, the wall of the stove being broken away to better illustrate the device.

FIG. 2 is a vertical sectional view taken generally on the line 2—2 of FIG. 1, and showing the tray or shelf structure in an alternative position in broken lines.

FIG. 3 is a sectional view illustrating in detail the configuration of the latch provided on the upper rail of the frame to releasably support the frame in the stove opening, the released position of the latch means being shown in broken lines.

DETAILED DESCRIPTION

Turning now to the drawings in greater detail, FIGS. 1 and 2 illustrate the front 10 or other generally vertical side wall of a conventional wood burning stove, and more particularly that portion of the stove which defines a door opening or access opening for the wood or other fuel and which has upper and lower marginal edges 10a, 10b respectively. Parallel side edges of this stove opening cooperate with these edges 10a and 10b to define the usual rectangular door opening for the stove. Normally, a door would be provided in hinged relationship to the front 10 of the stove but such door has been omitted for clarity, as has also the general outline for the stove itself.

The broiling device of the present invention includes a frame having a downwardly open channel 12 defining the lower marginal rail member of the frame, and a parallel upper angle iron member 14 adapted to abut the wall 10 of the stove. Means is provided for releasably retaining the frame in the stove opening and such means is indicated generally at 16 in FIGS. 1 and 2. Preferably, said means comprises a spring member 16a yieldingly mounted to the horizontal flange 14a of the member 14 as by rivet 16d for limited movement in a vertical plane so that a projecting pin 16b carried by spring 16a may be inserted in an opening provided for this purpose in the flange 14a of the member 14. This pin 16b is received behind the wall 10 of the stove as best shown in FIGS. 2 and 3.

Still with reference to the rectangular frame partially defined by the members 12 and 14, said frame is further defined by side members 18 and 20, tack welded at their opposite end portions or otherwise attached to the end portions of the horizontally extending members 12 and 14. Each such side member 18 and 20 of the frame includes an outwardly projecting flange, which flange defines a series of vertically spaced reversed L-shaped or bayonet slots. These slots are horizontally aligned with one another in the left and right side members, 18 and 20 respectively, and each slot opens outwardly toward the front or other wall of the stove to receive one of two pins 30, 30 provided for this purpose in the tray structure to be described. Two such pins must be received by the slots to hold the tray generally horizontally. Preferably, the two slots receiving the pins are adjacent, but, in any event there must be enough of such slots to provide for vertical adjustment of the tray over the wood coals or other fuel being used.

Turning now to a more detailed description of the tray or shelf structure supported from the rectangular frame by the pin means mentioned above, said structure preferably comprises two panels 32 and 34 pivotally connected to one another for hinged movement about an axis defined by horizontally aligned pins 36, 36. The axis of movement for these hinged panels 32 and 34 is provided near the projecting pins 30, 30 at the sides of the tray.

The inner panel 32 of the tray is of open rectangular configuration with side flanges 32a and 32b, each of which side flanges is provided with the two laterally outwardly projecting pins 30, 30 described previously.

The inner panel 32 of the tray structure thus projects into the stove between the side members 18 and 20 and is rigidly supported by means of the pins 30, 30 and the slots in the side members. A rectangular opening 32c is provided in this inner panel 32 with marginal edge portions defined by the inner panel itself so as to slidably support a grille 40 shown in position over this rectangular opening 32c in FIGS. 1 and 2. This is the broiling position for the grille 40 inside the stove.

The outer panel 34 of the tray structure is hingedly connected to the side flanges of the inner panel 32 by means of the aligned pivot pins 36, 36 so that it is movable between the extended position shown in full lines in FIG. 1, wherein said panels are both generally horizontal, and a stowed position (not shown) wherein said panels are folded into position adjacent one another for storing the broiler device. It will be apparent that such storage of the tray can be easily accomplished after it has been removed from the frame described previously. The outer panel or shelf 34 can be pivoted upwardly while the device is assembled as shown, at least sufficiently to cause any grease left on this panel to run back inside the stove. Its horizontal position permits its use in preparing food for the grille. The geometry of the overlapping portions of the inner and outer panels adjacent the hinge line is such that the 180 degree orientation is a limit position. Both the rectangular frame, and the shelf structure can be conveniently installed or disassembled from the stove itself.

The outer panel or shelf 34 has no opening provided therein but is instead provided with a solid floor 34a, and may also include upturned side flanges 34c and 34d the inner ends of which side flanges are provided with openings to receive the pivot pins 36, 36 mentioned previously. The tray may also include upturned inner and outer edge portions 32e and 34b for convenience in limiting the sliding movement of the grille 40.

The grille 40 is of conventional configuration and includes a slightly upturned handle portion 40a for the convenience of the user in manipulating the grille on the broiler tray.

What is claimed is:

1. A detachable broiler device for use with a stove having an access opening in one of its generally vertical side walls, the said device including a frame which is detachably secured to said one side wall at said access opening, and a broiler tray adapted for vertically adjustable connection with said frame, said tray including an open panel which projects through said access opening and is supported generally horizontally inside the stove when the tray is so adjustably connected for support of a broiler rack or grille, the said tray also including a shelf supported generally horizontally outside the stove when the tray is so adjustably connected.

2. The broiler of claim 1 wherein said shelf is pivotally connected with the open panel so that they can be pivoted toward each other for compact stowing.

3. A detachable broiler device for use with a stove having a generally rectangular access opening in one of its generally vertical side walls, the said device comprising a frame having vertical frame members adjacent opposite sides of the access opening and top and bottom frame members connected thereto, the bottom frame member having a downwardly opening channel to receive the bottom edge of the stove access opening and the top frame member having a latch for releasable connection with the vertical side wall of the stove adjacent the top margin of the access opening, and a broiler tray adapted for vertically adjustable connection with said frame, the tray including an open panel supported generally horizontally inside the stove when the tray is so adjustably connected for support of a broiler rack or grille.

4. The broiler device of claim 3 wherein said tray also includes a shelf supported generally horizontally outside the stove when the tray is so adjustably connected.

5. The broiler device of claim 4 wherein said shelf is pivotally connected with the open panel so that they can be pivoted toward each other for compact stowing.

6. The broiler of claim 3 wherein the vertical frame members define a plurality of vertically spaced slots, and the broiler tray has a pair of laterally projecting pins at each of its sides to be received in selected adjacent slots in the vertical frame members whereby to support the tray generally horizontally in selected vertical position.

* * * * *